United States Patent [19]

Yamauchi et al.

[11] Patent Number: 5,360,464

[45] Date of Patent: * Nov. 1, 1994

[54] METHOD FOR SPLICING AND REINFORCING CARBON COATED OPTICAL FIBERS

[75] Inventors: Ryozo Yamauchi; Akira Wada; Keiji Oohashi; Shinji Araki; Tsuyoshi Shimomichi, all of Sakura, Japan

[73] Assignee: Fujikura Ltd., Tokyo, Japan

[ * ] Notice: The portion of the term of this patent subsequent to Jun. 29, 2010 has been disclaimed.

[21] Appl. No.: 22,479

[22] Filed: Feb. 25, 1993

Related U.S. Application Data

[62] Division of Ser. No. 717,800, Jun. 19, 1991, Pat. No. 5,223,014.

[30] Foreign Application Priority Data

Jun. 19, 1990 [JP] Japan ................... 2-160711
Mar. 29, 1991 [JP] Japan ................... 3-91654

[51] Int. Cl.$^5$ .......................................... C03B 37/023
[52] U.S. Cl. ........................................ 65/410; 385/98
[58] Field of Search .................. 65/4.2, 4.21; 385/96, 385/98

[56] References Cited

U.S. PATENT DOCUMENTS 4,018,824  5/1991  Ooe et al. ........................... 65/4.2

FOREIGN PATENT DOCUMENTS 0292146  11/1988  European Pat. Off. .
2180369  3/1987  United Kingdom .

Primary Examiner—Robert L. Lindsay
Attorney, Agent, or Firm—Oblon, Spivak, McClelland, Maier & Neustadt

[57] ABSTRACT

The present invention relates to a method for the fusion splicing of carbon coated optical fibers and to a method for providing reinforced performance of the spliced points. Concretely, carbon coated optical fibers are fusion spliced in an atmosphere containing less than 0.5 vol % of oxygen without the removal of the carbon coating. In order to minimize the amount of damage to the carbon coating resulting from the fusion, the decline in the failure probability of the optical fiber is controlled by means of applying moisture to the spliced part or by means of the adhesion of the oxidized carbon gases to the optical fiber. On the other hand, the carbon coating layer which was removed by oxidation at the time of the fusion splicing is recoated by means of a CVD reaction using a laser as a heat source. By means of this, the decline in the fatigue characteristics of the spliced part can be controlled.

5 Claims, 4 Drawing Sheets

METHOD FOR SPLICING AND REINFORCING CARBON COATED OPTICAL FIBERS This is a division of application Ser. No. 07/717,800 filed on Jun. 19, 1991 now U.S. Pat. No. 5,223,014.

BACKGROUND OF THE INVENTION

This invention relates to a method and an apparatus for fusion splicing of carbon-coated optical fibers and for providing reinforced performance of the fused splicing in an optical data transmission fiber.

Of the various optical fibers known today, silica based optical fibers are generally used with a coating of an organic material, such as synthetic resin. The purpose of the coating is to protect the exterior surface of the fibers from being damaged by encounters with foreign objects in the environment, such as dust particles and sharp objects, and thereby to incur degradation in fracture strength. However, this type of coating cannot prevent the diffusion of environmental substances, such as water and small molecules such as hydrogen, into the fiber. If water molecules are adsorbed onto the surface of silica based optical fiber under stress, a fatigue phenomenon can occur, leading to a time-dependent degradation in mechanical strength.

Further, if hydrogen diffuses into the silica based optical fiber, light absorption loss due to molecular vibration of hydrogen molecules will increase; as well, absorptive losses due to OH radicals, formed by the reaction between dopants $P_2O_5$, $GeO_2$ and $B_2O_3$, can also increase.

To prevent such performance degradation, an optical fiber construction shown in FIG. 1 has been proposed. A silica based optical fiber 1, consisting of a core 1a and a cladding 1b, is coated with a carbon film coating 2 of 10–100 run thickness, made of carbonaceous materials such as amorphous carbon, followed further with an outer organic layer of resin coating 3 to comprise a carbon coated optical fiber 4. The carbon film coating 2 on the optical fiber 1 is generally formed by means of chemical vapor deposition (CVD) process.

In the meantime, the demand for long-distance transmission of signals by optical fiber is increasing, and since such fibers can only be produced in a finite length, the fibers must be spliced to build a long-distance optical communication line. The fiber splicing techniques include connector and fusion methods, but generally, arc fusion method, which involves butting the fiber ends and fusing the silica based optical fiber by arc discharge, is accepted as being the most durable of the available techniques.

In practicing the fusion splicing technique, the resin coating 3 must be removed from the fiber 4 before abutting the ends of the fibers and performing fusion splicing. In the process of fusion splicing, the heat of fusing has an effect of oxidizing the carbon and destroying the coating 2 in the regions near the weld. Such a splicing region of fiber 1 is unprotected and becomes susceptible to absorption of moisture from the atmosphere in the splicing region. Such exposed splicing regions were cause of serious concern, because adsorption of water vapor or exposure to water drops leads not only to long-term degradation of the mechanical strength of the splicing, but also to an increase in signal transmission losses.

Furthermore, the carbon coating layer is oxidized at the time of the fusion splicing, and there is a danger that the oxidization gas thereof will damage the optical fiber and thus lead to a decrease in strength.

SUMMARY OF THE INVENTION

An objective of the present invention is to provide a method of splicing protection so as to prevent the degradation in the mechanical strength and in the performance of optical signal transmission. Still another objective is to provide an apparatus for producing such a reinforced performance of splicing point.

This invention presents a method of depositing carbon film on splicing regions of a carbon coated optical fiber after it has been fusion spliced. This invention also presents an apparatus, for reinforcing the splicing regions, comprising heating means to heat the splicing regions; a covering section for providing a protective covering over the splicing surface regions (hereinafter called the surface for simplicity) and for forming a closed space around the splicing points; and gas delivering means for letting a protective gas into the protective covering.

Accordingly, an optical fiber spliced together by the method of the invention not only has a high splicing performance but also is able to retain the original performance level with a protective film of carbon by preventing the adsorption of moisture and diffusion of gaseous hydrogen into the splicing points.

Further, the invented apparatus is able to perform fusion splicing in an atmosphere containing less than 0.5 percent (%) by volume of oxygen, thereby minimizing the loss of the existing carbon film during the splicing operation, and thereby, the opportunities for moisture or carbon oxidization gas to come into contact with the surface of the spliced region are reduced, and as a result, the reduction in failure strength of the splice can be controlled.

Further, by performing the carbon film deposition process by utilizing photo-assisted CVD techniques, for example laser light, it becomes possible to perform a clean splicing operation on precisely defined splicing regions for carbon film recoating.

DETAILED DESCRIPTION OF THE INVENTION

The fusion splicing operation for carbon coated fibers is performed after removing the protective resin covering, such as UV curable resin, from one end of two fibers to be spliced, and exposing carbon film.

Figure 2:
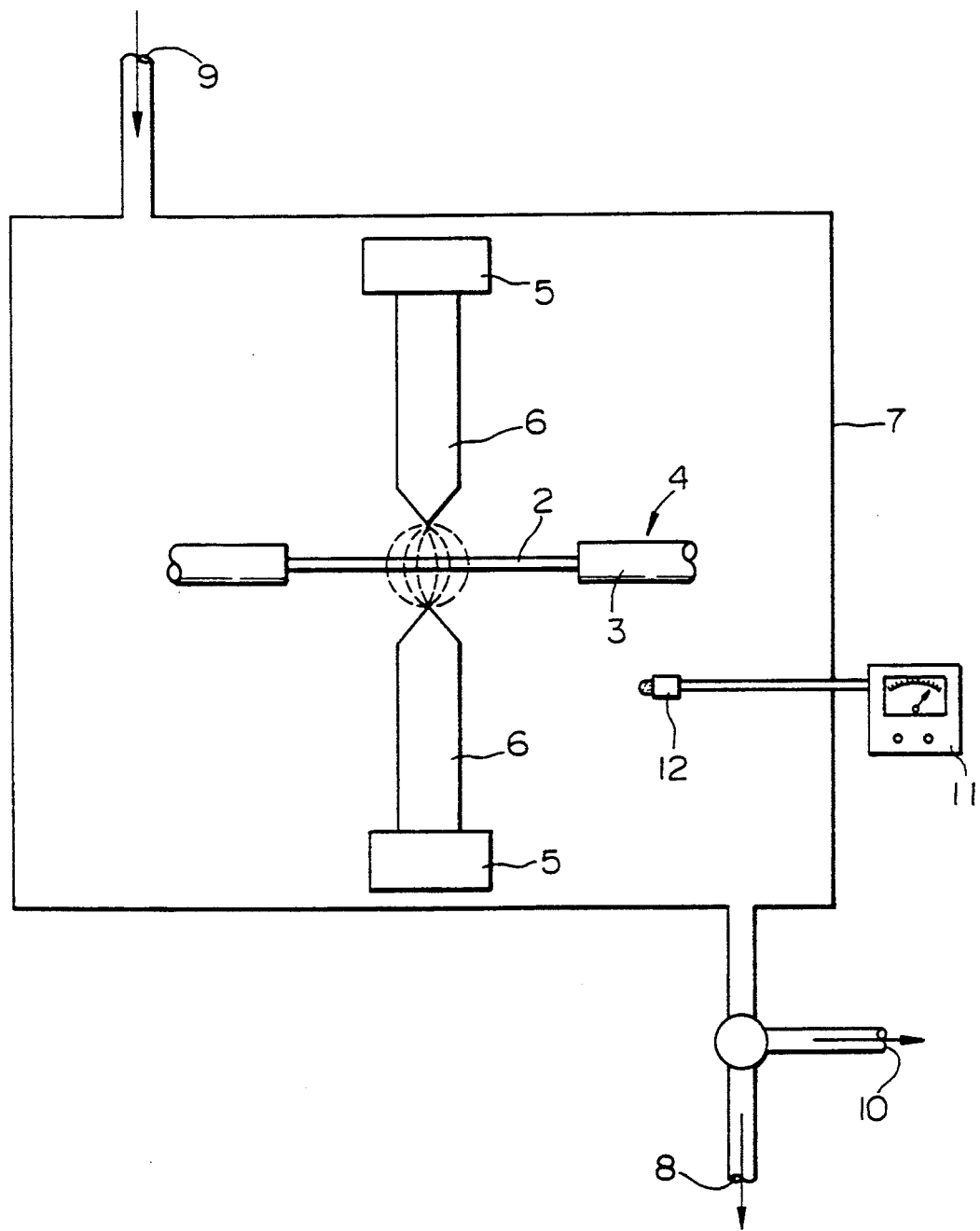
FIG. 2 is a schematic drawing to show an example of a splicing apparatus to perform fiber splicing in an atmosphere containing less than 0.5% by volume of oxygen.

It is possible and, in fact, preferable to perform the splicing operation in an atmosphere containing less than 0.5% by volume of oxygen. FIG. 2 shows an example of such an apparatus.

This fusion apparatus consists of an arc generating section which contains electrodes 5 and two V-grooves (not shown) for holding the fibers in place, and a sealable cover section 7 which houses the arc generating section. Each of the two V-grooves holds a fiber 4 and provides the alignment of the fibers for precision splicing. Perpendicular to the lengthwise direction of the fiber, and located on the extension of the electrodes 5 are a pair of opposing electrode tips 6. The cover section 7 is made of acrylic resin, for example, and includes air exhaust port 8, inert gas entry port 9 and a vent opening 10. A sensor tip 12 of an oxygen meter 11 is provided inside the sealable cover section 7.

Figure 1:
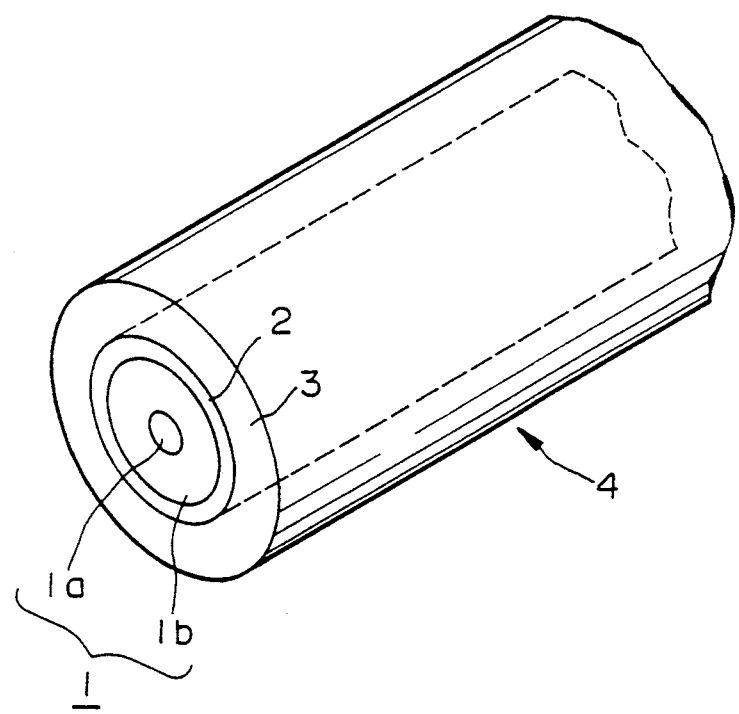
FIG. 1 is an oblique view of an example of a carbon coated optical fiber.

The operation of such an arc-fusion splicing apparatus is described in the following. The carbon coated fiber 1 (hereinafter referred to as the fiber 1) being spliced in this example is of the type, which was shown in FIG. 1, consisting of an inner carbon film coating 2 (hereinafter referred to as carbon film 2) and outer resin coating 3 (hereinafter referred to as resin coating 3). The cutting operation of the fiber 4 is performed conventionally so as to produce mirror finish on the end surfaces. The severed ends are then immersed in a solvent such as dichloromethane to remove the resin coating 3. The exposed ends of the fiber 4 are butted together and are then held in place in the V-grooves. The tips of the arcing electrodes 6 are placed in the vicinity of the splicing point. The cover section 7 is evacuated through the exhaust port 8, and an inert gas is led into the cover section to produce a concentration of oxygen of less than 0.5% by volume, to be confirmed by the oxygen meter 11. When such a condition is attained, fusion splicing of the butted ends is performed. After the completion of the splicing process, the inert gas is exhausted through the gas vent 10 so as to recover the gas.

In this condition, bared fiber surface is exposed in the vicinity of the splicing point in the fiber 4, because a part of the carbon film 2 has been burned off due to the heat of the splicing operation. The area of the bared region of the carbon film 2 increases even more when the splicing operation is carried out in air. When the operation is carried out in an atmosphere containing less than 0.5% oxygen by volume, there is less degradation in the mechanical strength of the spicing point, although the fact still remains that some bare fiber surface has become exposed.

Next step is to deposit carbon recoating to provide protection of the fused splicing point and the surface.

Figure 3:
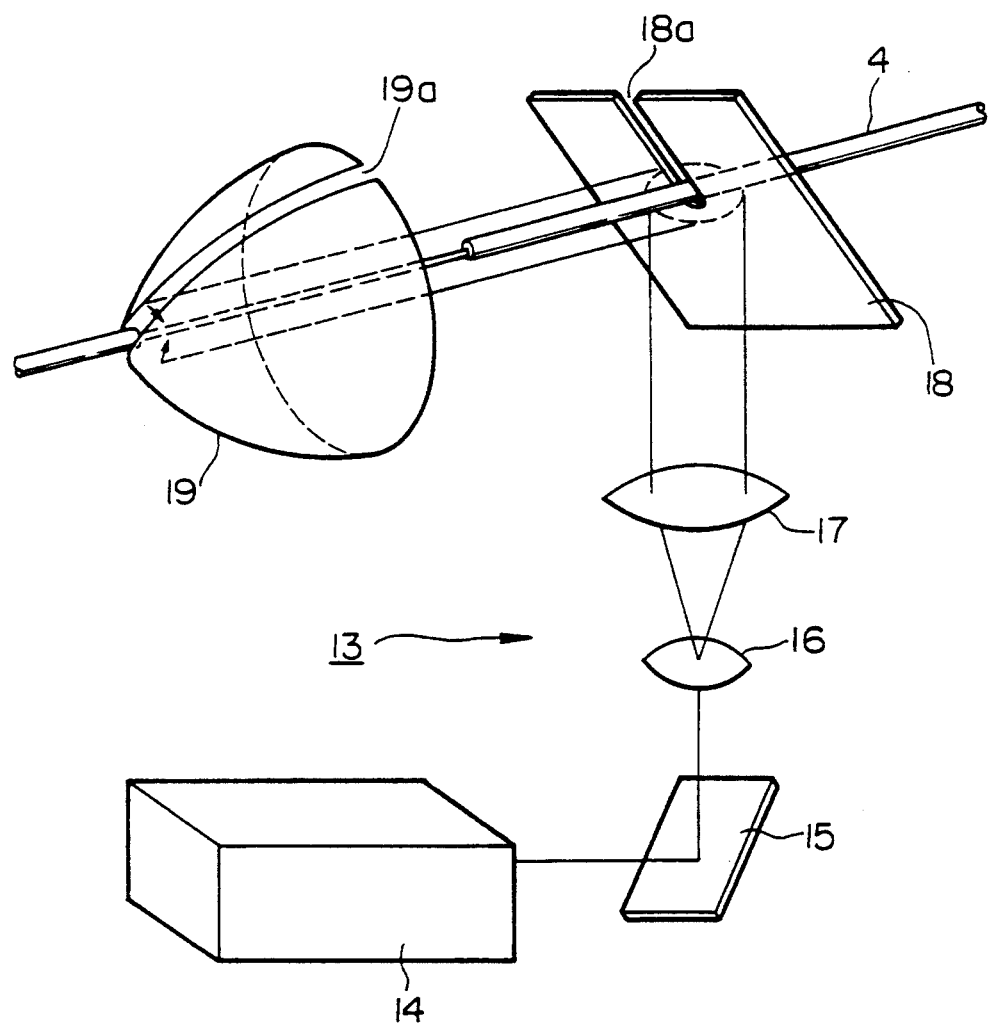
FIG. 3 is an oblique view of an arrangement of the main components of an apparatus for providing splicing reinforcement.
Figure 4:
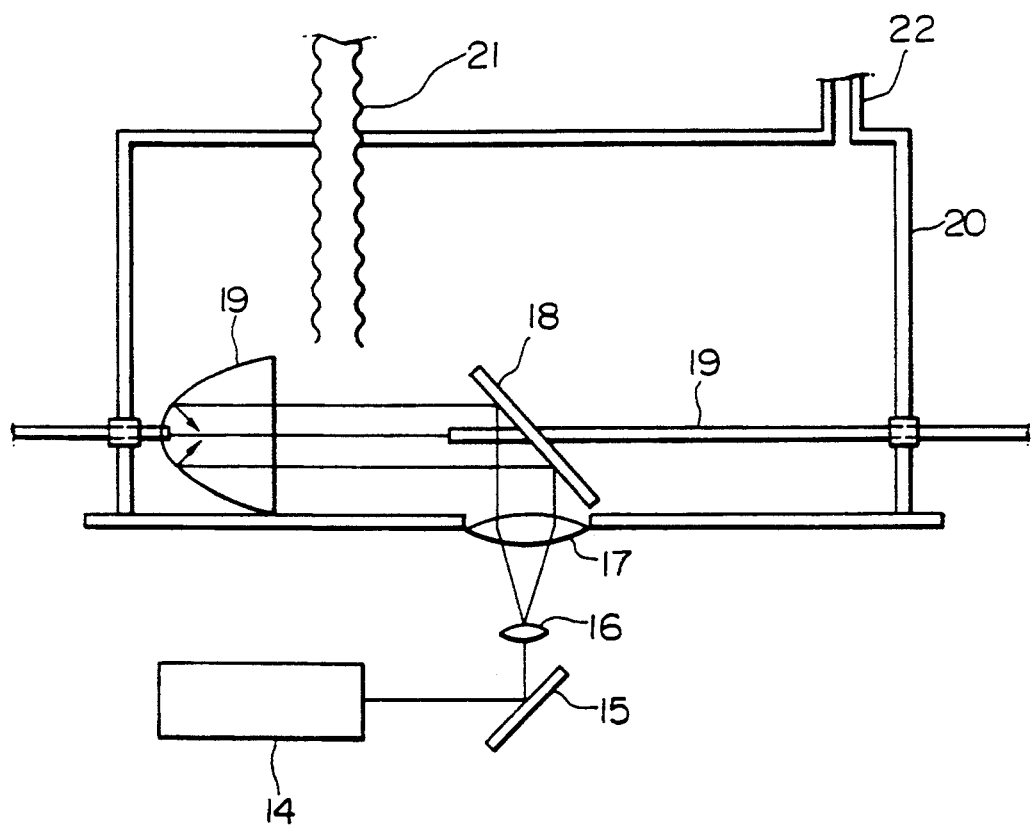
FIG. 4 is a schematic drawing to illustrate an example of the overall construction of the apparatus for providing splicing reinforcement.

FIGS. 3 and 4 refer to an example of the apparatus for applying such carbon recoating, and FIG. 3 shows the placement of the main components of the example apparatus. In this figure, 13 refers to a reflective type heating means which consists substantially of: an optical system including laser source 14, a first reflector 15, a first germanium lens 16, a second germanium lens 17 and a second reflector 18; and a parabolic mirror 19 serving as a light focusing device. The laser source 14 is preferably a carbon dioxide laser emitting a beam of 10.6 μm wavelength.

The laser beam from the laser source 14 reflects off the first reflector 15, passes through the first and second germanium lens to increase its beam size, reflects off the second reflector 18 to arrive at the parabolic mirror 19 as parallel beams and finally focuses at the focal point of the mirror. As shown in FIG. 3, the second reflector 18 and the parabolic mirror 19 are each provided with a slit 18a and 19a, respectively, through which the fiber 4 is threaded, so as to locate the spliced point at the focal point of the parabolic mirror 19.

As shown in FIG. 4, the above-mentioned components, the second germanium lens 17, the second reflector 18 and the parabolic mirror 19 are contained in a gas tight chamber 20, through which the fusion-spliced fiber 4 can passes through unrestrained. The chamber 20 is equipped with a gas inlet tube 21 for introducing reactant gases and an exhaust tube 22 to connect with an exhaust gas treatment facility (not shown).

The first step in the process of depositing carbon film on the welded section of the fiber, is to pass the spliced fiber 4, as shown in FIG. 4, through the chamber 20, through the slits, 19a and 18a respectively, of the parabolic mirror 19 and the second reflector 18, and place the joint at the focal point of the parabolic mirror 19.

The next step is to replace the atmosphere inside the chamber 20 with an inert gas, and then to introduce reactant gases through the gas inlet tube 21. The gases used in this step are straight chain hydrocarbon gases, such as methane, ethane, propane and acetylene, cyclic type hydrocarbon such as benzene and halogen family hydrocarbon, such as dichloroethane, trichloroethane and Freon and a suitable mixture of some or all of the preceding gases. The reactant gaseous mixture is diluted with an inert gas such as argon or nitrogen. The composition of the reactant gas in side the chamber 20, in particular in the vicinity of the fused splicing is preferably 50 to 80% methane by volume.

At this stage in the process, the laser source 14 is activated and the laser beam is directed to the parabolic mirror 19 which focuses the beam at the focal point. The laser source is a carbon dioxide laser operating at about 5 to 20 watts. The focused beam heats the spliced point to a temperature in the range of 700° to 1,000° C., and the reactant gas in this vicinity is thermally decomposed to precipitate carbon (CVD reaction) on the spliced point surface. As the reaction proceeds, the surface gradually becomes coated with carbon film. To achieve its former state of uniform covering around the fused spliced point, either the fiber 4 or the mirror 19 can be moved slightly in the fiber length direction. The thickness of this carbon deposit should be about the same as it was in the original carbon film, usually in the range of 10 to 100 nm. The carbon recoating can also overlap the original carbon film 2, which is present in the vicinity of the fused spliced point. The spent gas and the residual reactant gases are vented through the exhaust tube 22.

The recoated spliced point to restore the optical performance characteristics can be mechanically reinforced, as necessary, by reapplying a resin coating. There is no restriction on the method of forming this resin layer, and such methods as heat shrinkable tubing or the use of a liquid resin with UV-curing, for example, can be utilized. It is preferable that the carbon coating layer not be removed at the time of fusion splicing. The reason for this is that when the carbon coating layer is removed, there is a danger that the surface of optical fiber 4 will be damaged.

Further, this invention provides a method of performing both fusion splicing and carbon recoating operations in one apparatus. This can be accomplished by locating a part of the optical system shown in FIG. 3 inside the cover section 7 of the splicing apparatus shown in FIG. 2. By combining the two apparatuses, the cover section 7 and the chamber 20 can be shared, and upon the completion of the fusion splicing operation, the electrodes 5 can be moved away to be replaced with the beam focusing system and a part of the optical system to perform the recoating operation. By arranging the two operations in the above-mentioned way, it becomes possible to carry out recoating operation on a freshly fused silica based optical fiber surface, without raising a possibility of contamination from intervening period of exposure to the atmosphere.

EXAMPLES

Example 1

Fusion splicing operations were performed on carbon coated optical fibers 4 using the splicing apparatus illustrated in FIG. 2. The fiber 4 consisted of a 125 $\mu$m diameter silica based optical fiber 1 having a coating of carbon film 2 of 0.05 $\mu$m thickness, followed by a resin coating 3 of 250 $\mu$m thickness made of UV-cured urethane acrylate.

First, the fiber 4 was severed with a fiber cleaver, and the severed ends were immersed in dichloromethane to remove about 15 mm of the resin coating 3 from the ends. The cleaned fiber ends with the bared carbon film 2 were placed and fixed in position in the V-grooves. The interior of the cover section 7 was evacuated and then flushed with nitrogen to achieve an oxygen concentration of 0.05% by volume in the fusion environment. The flow rate of nitrogen was 0.05 liters/min. The voltage was applied to the electrodes 5 to perform fusion splicing of the fiber 4.

The spliced fiber was subjected to tensile testing to evaluate its strength, using the gage length of 300 mm and the pulling rate of 300 mm/min. The fracture strength was 1.53 Kg at a 50% failure probability level, based on sampling of 420 fusion spliced specimens.

Example 2

The fusion spliced fiber 4 was next placed in the apparatus shown in FIG. 4 to perform carbon recoating on the surface of the spliced region. The laser source 14 was a carbon dioxide laser of 10 W output power, and the optics was adjusted to provide a beam of 15 mm diameter from the second reflector 18 to the parabolic mirror 19. The feed gas delivered into the reaction chamber was Freon 211 diluted with ten times the volume of argon gas. The spliced surface was heated to about 800° to 900° C., and moved in one direction at a rate of 10 mm/min. Thus, a carbon recoating consisting of amorphous carbon having a 100 nm thickness was obtained.

The splicing strength of the recoated fiber was similarly evaluated with the results of 1.5 Kg at a 50% failure probability level and a static fatigue coefficient (n) of 200.

Example 3

The fusion splicing operation in a second preferred embodiment was carried out in the same way as that in the first preferred embodiment, except in the following details. The thickness of the carbon film 2 was 0.02 $\mu$m, and the inert gas used was He with the oxygen concentration in the fusion environment of 0.4 volume %.

The spliced fibers were subjected to tensile testing in the same way as in the first preferred embodiment, and the failure strength at a 50% probability level was 2.07 Kg.

Example 4

Carbon recoating was carried out as in the second preferred embodiment with the exception of methane as the feed gas diluted with argon at 10 times the volume.

The resulting recoating was amorphous carbon of 200 nm thickness. The failure strength at the same probability level was 2.00 Kg and the static fatigue coefficient (n) was 200.

Example 5

In this embodiment, the fusion splicing operation was carried out in ambient air without the cover section 7. The fiber 4 used was the same.

In this case, it was observed that about 5 mm of the carbon film 2 was lost due to oxidation. The result of strength testing using the same procedure as in the first preferred embodiment was 0.72 Kg at a 50% failure probability level.

The fused fibers were subjected to carbon recoating of 500 nm thickness, following the same procedure as in the second preferred embodiment. The fracture strength was 0.7 Kg at the same probability level, and the fatigue coefficient (n) was 200.

Example 6

The fusion splicing of a carbon coated optical fiber 4 was conducted in exactly the same way as in the first preferred embodiment, except that a carbon coated optical fiber 4 with a 0.05 m carbon coating layer formed thereon was used, a flow amount of 0.4 liters/min of nitrogen gas was introduced into the cover section 7, and the concentration of oxygen within cover section 7 was 0.5 vol %.

At the spliced point of the carbon coated optical fibers 4 which were fusion spliced in this manner, the carbon coating layer 2 was subjected to oxidation in a 1 mm area and removed. Furthermore, a tensile test was conducted on the fusion spliced parts of the carbon coated optical fibers 4 which were obtained and their failure strength was thus investigated. As a result of tensile tests which were conducted under the same conditions as in the first preferred embodiment, it was discovered that the failure strength at which there was a 50% failure probability level was 0.87 kg.

It is clear from the results of the preferred embodiments that carbon coating on the fused spliced point of optical fiber increases the mechanical properties, such as the fatigue coefficient, and it can also be understood that the environmental effects, such as water and hydrogen, are minimized. Further advantage of the present invention is that by performing the fusion splicing operation in an atmosphere of less than 0.5 volume % oxygen, it is possible to minimize the loss of mechanical strength.

We claim:

1. A reinforcing method for a fusion spliced part of carbon coated optical fibers, the method comprising the steps of:
    (a) fusion splicing the fibers in an inert gas atmosphere without the removal of the carbon coating of a fusion part of the carbon coated optical fibers which are to be spliced; and
    (b) re-coating with a carbon in an inert gas atmosphere on the fusion spliced part by means of a CVD method utilizing a radiation-type heating means.

2. A reinforcing method for fusion spliced parts of carbon coated optical fibers in accordance with claim 1, in which the coating of the carbon is conducted in a temperature range of 700°–1000° C.

3. A reinforcing method for fusion spliced parts of carbon coated optical fibers in accordance with claim 1, in which the radiation-type heating means is a laser.

4. A reinforcing method for fusion spliced parts of carbon coated optical fibers in accordance with claim 2, in which the radiation-type heating means is a laser.

5. A reinforcing method for fusion spliced parts of carbon coated optical fibers in accordance with claim 1, in which the thickness of a carbon layer of the fusion spliced part is within a range of 50–200 nm.

* * * * *